UNITED STATES PATENT OFFICE

CHRISTIAN J. HANSEN, OF ESSEN-RUHR, GERMANY, ASSIGNOR, BY MESNE ASSIGNMENTS, TO THE KOPPERS COMPANY, OF PITTSBURGH, PENNSYLVANIA, A CORPORATION OF DELAWARE

METHOD OF TREATING THIOCYANOGEN COMPOUNDS

No Drawing. Application filed August 9, 1928, Serial No. 298,616, and in Germany July 6, 1928.

My invention refers to the treatment of thiocyanogen compounds and more especially ammonium thiocyanates, whereby a decomposition of such compounds is obtained and sulfur and the corresponding sulfates, such as ammonium sulfate, are recovered. It is an object of my invention to provide means whereby this decomposition of the thiocyanogen compounds and conversion into sulfates and free sulfur can be effected in a simpler and more efficient manner and at lower cost, than was hitherto possible.

I have now found that ammonium thiocyanate and other thiocyanogen compounds can be converted into sulfates and sulfur by heating them in the presence of thiosulfates and sulfuric acid.

I am aware that it is known to decompose ammonium thiocyanate by heating same with sulfuric acid or with ammonium bisulfate. However this mode of proceeding has no commercial value for the reason that the free thiocyanic acid which is developed, will destroy the vessels, no matter of what metal they are constructed.

The process according to the present invention allows effecting the conversion without any danger to ordinary acid proof vessels. It is of particular value in those cases where sulfate solutions containing free sulfuric acid are available. Such solutions are obtained for instance if in accordance with my copending application for patent of the United States for "Treating thiocyanates," application Serial Number 298,617, filed Aug. 9, 1928, executed of even date herewith solutions containing ammonium thiocyanate, for instance the washing liquors obtained in the purification of coal distillation gases are decomposed with the aid of sulfur dioxide, bisulfite or polythionates in excess. For in this case the mother liquids containing more or less sulfuric acid, which results in the evaporation of the acid ammonium sulfate solution, can be returned into the decomposition process.

While I have ascertained in practice that the presence of thionates, preferably in excess over the amount equivalent to that of the thiocyanogen compound to be decomposed, exerts a strong protective effect on the walls of the reaction vessels, I cannot undertake to explain the phenomena underlying this fact. The extremely strong corrosive properties of the reaction mixture heretofore used is obviously due to its contents of free thiocyanic acid, which is formed by the interaction of thiocyanates and sulfuric acid, and which is known to have similar properties as hydrochloric acid, the more so, if an excess of free sulfuric acid is present. On the other hand the thiosulfates used according to my invention are susceptible of reacting with thiocyanates in the presence of sulfur dioxide (which can be formed by the interaction of thiosulfate and sulfuric acid) according to the equation

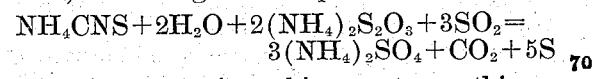
$$NH_4CNS + 2H_2O + 2(NH_4)_2S_2O_3 + 3SO_2 = 3(NH_4)_2SO_4 + CO_2 + 5S$$

whereby ammonium thiocyanate, or thiocyanic acid formed by its interaction with free sulfuric acid, are consumed. However, since the decomposition of all the thiocyanic acid contents takes some hours, while the corrosive properties of the mixture are diminished from the beginning, the explanation above given is not altogether satisfactory. In view of the present state of my investigations I am inclined to assume a particular protective effect exerted by the thiosulfates used, or by compounds formed by their interaction with the other reagents; but I do not wish to be bound to any one of the explanations given above, since my invention can be carried out successfully irrespective of whether these explanations are correct or not.

Example 1

To a watery solution containing 100 kgs. ammonium thiocyanate and 389.3 kgs., ammonium thiosulfate are added 1289 kgs. of a 20 per cent sulfuric acid. This liquor is heated to about 200° C. in an autoclave provided with an acid-proof lining or a chrome-nickel-steel lining resisting the action of sulfur dioxide. At the end of about two hours the decomposition is complete and there is obtained a watery solution containing 520.7 kgs. ammonium sulfate, and further 168.5 kgs. pure molten sulfur and 57.8 kgs. carbon dioxide.

*Example 2*

To a solution of 100 kgs., ammonium thiocyanate and 2143 kgs. ammonium thiosulfate in 2500 kgs. water are added 3220 kgs. of sulfuric acid of 20 per cent. The mixture is treated as described with reference to Example 1. There results a watery solution containing 2083 kgs. ammonium sulfate and there are further obtained 674 kgs. of pure molten sulfur and 57.8 kgs. carbon dioxide.

Various changes may be made in the details disclosed in the foregoing specification without departing from the invention or sacrificing the advantages thereof.

I claim:—

1. The method of decomposing thiocyanogen salts comprising acting on such compound with sulfuric acid and a thiosulfate.

2. The method of decomposing ammonium thiocyanate comprising heating a solution of this salt with sulfuric acid and ammonium thiosulfate.

3. The method of decomposing thiocyanogen salts comprising acting on such compound under pressure with sulfuric acid and a thiosulfate.

4. The method of decomposing ammonium thiocyanate comprising heating a solution of this salt in a closed vessel with sulfuric acid and ammonium thiosulfate.

In testimony whereof I affix my signature.

CHRISTIAN J. HANSEN.